United States Patent
Wang et al.

(10) Patent No.: US 12,159,107 B2
(45) Date of Patent: Dec. 3, 2024

(54) METHOD FOR AUTOMATICALLY IDENTIFYING WORD REPETITION ERRORS

(71) Applicant: CHINA NATIONAL INSTITUTE OF STANDARDIZATION, Beijing (CN)

(72) Inventors: Haitao Wang, Beijing (CN); Xinyu Cao, Beijing (CN); Liangliang Liu, Beijing (CN); Changqing Zhou, Beijing (CN)

(73) Assignee: CHINA NATIONAL INSTITUTE OF STANDARDIZATION, Beijing (CN)

( * ) Notice: Subject to any disclaimer, the term of this patent is extended or adjusted under 35 U.S.C. 154(b) by 369 days.

(21) Appl. No.: 17/640,845

(22) PCT Filed: Feb. 3, 2021

(86) PCT No.: PCT/CN2021/074961
§ 371 (c)(1),
(2) Date: Mar. 7, 2022

(87) PCT Pub. No.: WO2021/258739
PCT Pub. Date: Dec. 30, 2021

(65) Prior Publication Data
US 2022/0343070 A1    Oct. 27, 2022

(30) Foreign Application Priority Data

Jun. 22, 2020   (CN) .......................... 202010576591.2

(51) Int. Cl.
*G06F 40/232*       (2020.01)
*G06F 40/242*       (2020.01)

(52) U.S. Cl.
CPC .......... *G06F 40/232* (2020.01); *G06F 40/242* (2020.01)

(58) Field of Classification Search
CPC .... G06F 40/232; G06F 40/242; G06F 40/284; Y02D 10/00
(Continued)

(56) References Cited

U.S. PATENT DOCUMENTS

2012/0232883 A1    9/2012   Anismovich et al.

FOREIGN PATENT DOCUMENTS

CN   102567371 A        7/2012
CN   105045778 A   *   11/2015
(Continued)

OTHER PUBLICATIONS

A Construction Engineering Domain New Word Detection Method with the Combination of BiLSTM-CRF and Information Entropy by Ling Sun. (File Name: Information Entropy by Sun) (Year: 2019).*
(Continued)

*Primary Examiner* — Pierre Louis Desir
*Assistant Examiner* — Fouzia Hye Solaiman
(74) *Attorney, Agent, or Firm* — Bayramoglu Law Offices LLC

(57) ABSTRACT

A method for automatically identifying word repetition errors includes the following steps: after performing word segmentation on a large-scale training corpus, performing statistics to obtain two-tuple and three-tuple structures including repeated words in the training corpus, and repeated combination degrees, left contextual adjacent word information entropy and right contextual adjacent word information entropy in the training corpus; performing statistics and recording words containing repeated characters in a Chinese dictionary and establishing a repeated word library of the Chinese dictionary; judging the repeated words appearing in the text to be subjected to error checking based on the repeated words in the Chinese dictionary; and judging the repeated words appearing in the text to be subjected to
(Continued)

error checking based on the repeated combination degrees, left contextual adjacent word information entropy and right contextual adjacent word information entropy obtained by performing statistics.

7 Claims, 1 Drawing Sheet

(58) Field of Classification Search
USPC .............................................................. 704/9
See application file for complete search history.

(56) References Cited

FOREIGN PATENT DOCUMENTS

| CN | 108268440 A | 7/2018 |
|----|-------------|--------|
| CN | 111709228 A | 9/2020 |

OTHER PUBLICATIONS

Ben Lutkevich, natural language processing (NLP), 2021, retrieved from: http://web.archive.org/web/20211226120243/https://www.techtarget.com/searchenterpriseai/definition/natural-language-processing-NLP.

* cited by examiner

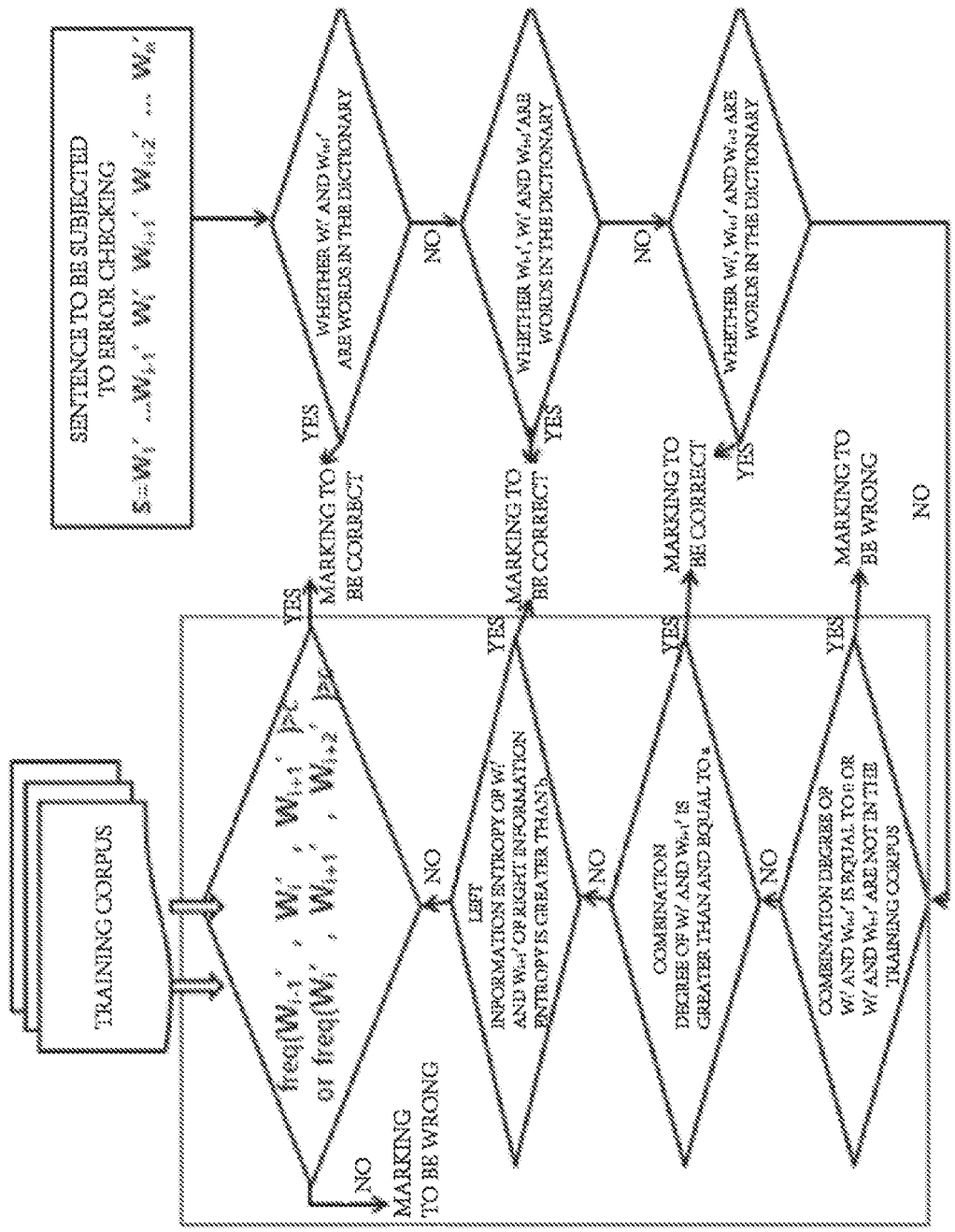

METHOD FOR AUTOMATICALLY IDENTIFYING WORD REPETITION ERRORS

CROSS REFERENCE TO THE RELATED APPLICATIONS

This application is the national phase entry of International Application No. PCT/CN2021/074961, filed on Feb. 3, 2021, which is based upon and claims priority to Chinese Patent Application No. 202010576591.2, filed on Jun. 22, 2020, the entire contents of which are incorporated herein by reference.

TECHNICAL FIELD

The present invention relates to a natural language processing method, in particular to a method for discovering word repetition errors in the field of Chinese automatic proofreading.

BACKGROUND

In the era of big data, the acceleration of text data is progressing, which is resulting in increased errors in the text, including word repetition errors (also known as insertion errors). In Chinese, some words can appear repeatedly, such as "yan jiu yan jiu", but some words cannot appear repeatedly, such as "dao qian dao qian", "de de". Once they appear repeatedly, they are repetition errors.

How to automatically discover word repetition errors in the text is one of the research contents of Chinese text automatic proofreading.

In some cases, it is reasonable to use repeated words in Chinese, so a simple judgment of repeated words will bring a lot of misjudgments. Now, in most of the Chinese text automatic proofreading, the word repetition errors are not judged separately, but judged by means of simply using the binary or ternary information of words. However, most of the repeated words are not shown in dictionaries, because it is a common language phenomenon in daily language. Therefore, a method capable of judging the repetition errors in words accurately and efficiently is imperative.

SUMMARY

The purpose of the invention is as follows. In order to solve the shortcomings in the prior art, the present invention provides a method for automatically identifying word repetition errors.

The technical solution is as follows. In order to solve the above technical problem, the present invention provides a method for automatically identifying word repetition errors, including the following steps:

after performing word segmentation on a large-scale training corpus, performing statistics to obtain two-tuple and three-tuple structures including repeated words in the training corpus, and repeated combination degrees, left contextual adjacent word information entropy and right contextual adjacent word information entropy in the repeated words;

performing statistics to obtain words containing repeated characters in a Chinese dictionary, recording the words and establishing a repeated word library of the Chinese dictionary;

judging the repeated words appearing in the text to be subjected to error checking based on the repeated words in the Chinese dictionary; and judging the repeated words appearing in the text to be subjected to error checking based on the repeated combination degrees, left contextual adjacent word information entropy and right contextual adjacent word information entropy obtained by performing statistics.

Preferably, the step of, after performing word segmentation on the large-scale training corpus, performing statistics to obtain a two-tuple structure and a three-tuple structure including repeated words in the training corpus, and repeated combination degrees, left contextual adjacent word information entropy and right contextual adjacent word information entropy in the repeated words, includes the following steps:

11) scanning all sentences in the training corpus to obtain all 2-tuples and 3-tuples containing the repeated words, and performing statistics to obtain frequencies that each tuple appears in the training corpus, respectively; wherein:

performing word segmentation on a sentence S in the training corpus to obtain $S=W_1 \ldots W_n$, where $W_i$ is the words in the Chinese dictionary, $1<=i<=n$;

for the sentence S, if there is i enabling $W_i=W_{i+1}$ to be satisfied, performing statistics to obtain frequencies $freq(W_i, W_{i+1})$ that a word string gram1 corresponding to a 2-tuple $(W_i, W_{i+1})$ appears in the training corpus, frequencies $freq(W_{i-1}, W_i, W_{i+1})$ that a word string gram2 corresponding to a 3-tuple $(W_{i-1}, W_i, W_{i+1})$ appears in the training corpus, and frequencies $freq(W_i, W_{i+1}, W_{i+2})$ that a word string gram3 corresponding to a 3-tuple $(W_i, W_{i+1}, W_{i+2})$ appears respectively;

12) calculating the repeated combination degree of the 2-tuple $(W_i, W_{i+1})$, as follows:

$$\text{Degree}(W_i, W_{i+1}) = \frac{\log P(W_i, W_{i+1})}{\log P(W_i) * \log P(W_{i+1})},$$

$$\text{wherein, } P(W_i, W_{i+1}) = \frac{freq(W_i, W_{i+1})}{N1},$$

$$P(W_i) = \frac{freq(W_i)}{N},$$

$$P(W_{i+1}) = \frac{freq(W_{i+1})}{N},$$

wherein, $freq(W_i)$ is the frequency that a word $W_i$ appears in the training corpus; $freq(W_{i+1})$ is the frequency that a word $W_{i+1}$ appears in the training corpus; N1 is a sum of frequencies that all the 2-tuples $(W_i, W_{i+1})$ containing the repeated words in the training corpus appear in the training corpus; N is a total frequency that all words in the training corpus appear in the training corpus;

13) for the 3-tuples $(W_{i-1}, W_i, W_{i+1})$ and $(W_i, W_{i+1}, W_{i+2})$, for each pair of $W_i=W_{i+1}$, marking $W_i$ as W without loss of generality, marking all left contextual words $W_{i-1}$ as $\{C1, \ldots, Cn\}$, and marking all right contextual words $W_{i+2}$ as $\{D1 \ldots Dn\}$, and calculating the left contextual adjacent word information entropy LE(WW) and the right contextual adjacent word information entropy RE(WW), respectively, as follows:

$$LE(WW) = -\sum_{i=0}^{n} P(C_i \mid WW) * \log P(C_i \mid WW),$$

-continued $$RE(WW) = -\sum_{i=0}^{n} P(D_i \mid WW) * \log P(D_i \mid WW),$$

wherein $$P(C_i \mid WW) = \frac{P(C_i, WW)}{P(WW)} = \frac{freq(C_i, WW)}{freq(WW)},$$

$$P(D_i \mid WW) = \frac{P(D_i, WW)}{P(WW)} = \frac{freq(WW, D_i)}{freq(WW)};$$

wherein, freq($C_i$, WW) is the frequency that a word string corresponding to the 3-tuple ($C_i$, W, W) appears in the training corpus; freq($WWD_i$,) is the frequency that a word string corresponding to the 3-tuple (W, W, $D_i$) appears in the training corpus.

Preferably, the step of performing statistics to obtain words containing repeated characters in the Chinese dictionary, recording the words and establishing a repeated word library of the Chinese dictionary includes:

21) performing statistics to obtain the words containing repeated characters in the Chinese dictionary; and
22) establishing a repeated word library of the Chinese dictionary and an index structure thereof for recording and storing.

Preferably, the step of judging the repeated words appearing in the text to be subjected to error checking based on the repeated words in the Chinese dictionary is: performing word segmentation on a sentence corresponding to the text to be subjected to error checking, and judging the repeated words appearing in the text to be subjected to error checking based on the repeated word library of the Chinese dictionary; and includes:

31) performing word segmentation on a sentence S' corresponding to the text to be subjected to error checking to obtain S'=$W_1$' ... $W_n$';
32) if $W_i$'=$W_{i+1}$' is satisfied, judging whether $W_i$'$W_{i+1}$' is a word in the repeated word library of the Chinese dictionary; if yes, judging $W_i$'$W_{i+1}$' to be a correct repeated word; otherwise, turn to step 33).
33) if $W_i$'$W_{i+1}$' is not a word in the repeated word library of the Chinese dictionary, and if a word on a left thereof is not empty, judging whether $W_{i-1}$'$W_i$'$W_{i+1}$' is a word in the repeated word library of the Chinese dictionary; if yes, judging $W_i$'$W_{i+1}$' to be a correct repeated word; otherwise, if a word on a right thereof is not empty, judging whether $W_i$'$W_{i+1}$'$W_{i+2}$' is a word in the repeated word library of the Chinese dictionary; if yes, judging $W_i$'$W_{i+1}$' to be a correct repeated word; otherwise, turn to the step of judging the repeated words appearing in the text to be subjected to error checking based on the repeated combination degrees, left contextual adjacent word information entropy and right contextual adjacent word information entropy obtained by performing statistics.

More preferably, the step of judging the repeated words appearing in the text to be subjected to error checking based on the repeated combination degrees, left contextual adjacent word information entropy and right contextual adjacent word information entropy obtained by performing statistics includes the following steps:

41) for the sentence S'=$W_1$' ... $W_n$' corresponding to the segmented text subjected to error checking, and $W_i$'=$W_{i+1}$' existing therein, judging whether $W_i$'$W_{i+1}$' exists in the training corpus, if $W_i$'$W_{i+1}$' does not exist in the training corpus, judging $W_i$'$W_{i+1}$' to be an incorrect repeated word, and marking Wi' and Wi+1' as errors; if $W_i$'$W_{i+1}$' exists in the training corpus, judging whether the repeated combination degree Degree($W_i$', $W_{i+1}$') is equal to 0, and if yes, judging $W_i$'$W_{i+1}$' to be an incorrect repeated word, and marking Wi' and Wi+1' as errors; otherwise, turn to step 42);

42) judging whether the repeated combination degree Degree($W_i$', $W_{i+1}$') is greater than $\alpha$, wherein $\alpha$ is a first preset threshold, and if yes, judging $W_i$'$W_{i+1}$' to be a correct repeated word; otherwise, turn to step 43);

43) judging the left contextual adjacent word information entropy and the right contextual adjacent word information entropy, if the left contextual adjacent word information entropy LE($W_i$'$W_{i+1}$')>$\beta$ or the right contextual adjacent word information entropy RE($W_i$'$W_{i+1}$')>$\beta$ wherein $\beta$ is a second preset threshold, judging $W_i$'$W_{i+1}$' to be a correct repeated word; otherwise, turn to step 44);

44) judging frequencies that a 3-tuple $W_{i-1}$'$W_i$'$W_{i+1}$' and a 3-tuple $W_i$'$W_{i+1}$'$W_{i+2}$' appear in the training corpus, if freq($W_{i-1}$', $W_i$', $W_{i+1}$')>c or freq($W_i$', $W_{i+1}$', $W_{i+2}$')>c, wherein c is a third preset threshold, judging $W_i$'$W_{i+1}$' to be a correct repeated word; otherwise, judging $W_i$'$W_{i+1}$' to be an incorrect repeated word, and marking $W_i$' and $W_{i+1}$' as errors.

Preferably, the first preset threshold $\alpha$ is 3.0; the second preset threshold $\beta$ is 3.0; and the third preset threshold c is 3.0.

Preferably, in step 44), if $W_{i-1}$'$W_i$'$W_{i+1}$' does not exist in the training corpus, freq($W_{i-1}$', $W_i$', $W_{i+1}$')=0, and if $W_i$'$W_{i+1}$'$W_{i+2}$' does not exist in the training corpus, freq($W_i$', $W_{i+1}$', $W_{i+2}$')=0.

Preferably, in step 11), if i=1, $W_{i-1}$ is a first character string representing a beginning of the sentence; if i+1=n, $W_{i+2}$ is a second character string representing an ending of the sentence.

The advantages are as follows. In the method for automatically identifying word repetition errors provided by the present invention, after performing word segmentation on a large-scale training corpus, two-tuple and three-tuple structures including repeated words in the training corpus, and repeated combination degrees, left contextual adjacent word information entropy and right contextual adjacent word information entropy in the repeated words are obtained by performing statistics, the words containing repeated characters in a Chinese dictionary are obtained by performing statistics and then recorded. Based on this, as for a text to be subjected to error checking, first the repeated words appearing in the text are judged based on the repeated words in the Chinese dictionary, then the repeated words appearing in the text are judged based on the repeated combination degrees, left contextual adjacent word information entropy and right contextual adjacent word information entropy obtained by performing statistics, so as to provide a judgment and identification whether they are correct or incorrect repeated words. This method can rapidly judge and identify whether the repeated words are recorded in the Chinese dictionary, but also can further effectively judge and identify whether the repeated words are recorded not in the Chinese dictionary (are not recorded in the Chinese dictionary) but belong to daily expressions in conjunction with the common language phenomenon in the daily expressions, which is more rapid and comprehensive. Moreover, it can be seen from tests that the present invention has a recall rate of 84% or more, and a precision rate of 77% or more, that is, the present invention is accurate and efficient. Meanwhile, the present invention marks the incorrect repeated word, and it is convenient for a user clearly and intuitively to obtain a clear prompt of word repetition errors in the text to be subjected to error checking, such that the test can be updated in time by flexibly and closely combining the evolution of daily expressions, and has high practicability.

DESCRIPTION OF THE DRAWINGS

FIG. 1 is a flow diagram of a method for automatically identifying word repetition errors provided by an embodiment.

DETAILED DESCRIPTION OF THE EMBODIMENTS

The present invention will be further described in detail in conjunction with the embodiments and the drawings, and the following embodiments do not constitute a limitation on the present invention.

The present invention provides a method for automatically identifying word repetition errors, and the method includes the following steps:

after performing word segmentation on a large-scale training corpus, performing statistics to obtain two-tuple and three-tuple structures including repeated words in the training corpus, and repeated combination degrees, left contextual adjacent word information entropy and right contextual adjacent word information entropy in the repeated words;

performing statistics to obtain words containing repeated characters in a Chinese dictionary, recording the words, and establishing a repeated word library of the Chinese dictionary;

judging the repeated words appearing in the text to be subjected to error checking based on the repeated words in the Chinese dictionary; and judging the repeated words appearing in the text to be subjected to error checking based on the repeated combination degrees, left contextual adjacent word information entropy and right contextual adjacent word information entropy obtained by performing statistics.

In the method for automatically identifying word repetition errors provided by the present invention, the step of, after performing word segmentation on the large-scale training corpus, performing statistics to obtain a two-tuple structure and a three-tuple structure including repeated words in the training corpus, and repeated combination degrees, left contextual adjacent word information entropy and right contextual adjacent word information entropy in the repeated words, includes the following steps:

11) scanning all sentences in the training corpus to obtain all 2-tuples and 3-tuples containing the repeated words in the training corpus, and performing statistics on frequencies that each tuple appears in the training corpus, respectively; wherein performing word segmentation on a sentence S in the training corpus to obtain $S = W_1 \ldots W_n$, where $W_i$ is the word in the Chinese dictionary, $1 \leq i \leq n$;

for the sentence S, if there is i enabling $W_i = W_{i+1}$ to be satisfied, performing statistics on frequencies freq($W_i$, $W_{i+1}$) that a word string gram1 corresponding to a 2-tuple ($W_i$, $W_{i+1}$) appears in the training corpus, frequencies freq($W_{i-1}$, $W_i$, $W_{i+1}$) that a word string gram2 corresponding to a 3-tuple ($W_{i-1}$, $W_i$, $W_{i+1}$) appears in the training corpus, and frequencies freq($W_i$, $W_{i+1}$, $W_{i+2}$) that a word string gram3 corresponding to a 3-tuple($W_i$, $W_{i+1}$, $W_{i+2}$) appears respectively;

in the text, freq(gram) can also be used to represent the frequency that the words or tuples corresponding to gram (words or word string) appear in the training corpus without loss of generality; gram represents the word string corresponding to a certain word or a certain tuple;

in the present embodiment, if i=1, $W_{i-1}$ is a first character string representing a beginning of the sentence; if i+1=n, $W_{i+2}$ is a second character string representing an ending of the sentence. In the present embodiment, the first character string is "#Begin #", and the second character string is "#End #". That is to say, in the present embodiment, if i=1, $W_{i-1}$ is "#Begin #" representing the beginning of the sentence; if i+1=n, $W_{i+2}$ is "#End #" representing the ending of the sentence;

12) calculating the repeated combination degree of the 2-tuple ($W_i$, $W_{i+1}$), which is:

$$\text{Degree}(W_i, W_{i+1}) = \frac{\log P(W_i, W_{i+1})}{\log P(W_i) * \log P(W_{i+1})},$$

$$\text{wherein, } P(W_i, W_{i+1}) = \frac{freq(W_i, W_{i+1})}{N1},$$

$$P(W_i) = \frac{freq(W_i)}{N},$$

$$P(W_{i+1}) = \frac{freq(W_{i+1})}{N},$$

wherein, freq($W_i$) is the frequency that a word $W_i$ appears in the training corpus; freq($W_{i+1}$) is the frequency that a word $W_{i+1}$ appears in the training corpus; N1 is a sum of frequencies that all the 2-tuples ($W_i$, $W_{i+1}$) containing the repeated words in the training corpus appear in the training corpus; N is a total frequency that all words in the training corpus appear in the training corpus;

as result, N1 is a sum of frequencies that the word string gram1 corresponding to all the 2-tuples ($W_i$, $W_{i+1}$) containing the repeated words in the training corpus appear in the training corpus;

in other word, N1 is a sum of frequencies that all word strings gram1 in the training corpus appear in the training corpus, wherein the word strings gram1 are word strings gram1 corresponding to several 2-tuples ($W_i$, $W_{i+1}$) satisfying $W_i = W_{i+1}$ in the training corpus. Further, in the present embodiment, N2 is a sum of frequencies that all word strings gram2 in the training corpus appear in the training corpus, wherein the word strings gram2 are word strings gram2 corresponding to several 3-tuples ($W_{i-1}$, $W_i$, $W_{i+1}$) satisfying $W_i = W_{i+1}$ in the training corpus; and N3 is a sum of frequencies that all word strings gram3 in the training corpus appear in the training corpus, wherein the word strings gram3 are word strings gram3 corresponding to several 3-tuples ($W_i$, $W_{i+1}$, $W_{i+2}$) satisfying $W_i = W_{i+1}$ in the training corpus.

13) for the 3-tuples ($W_{i-1}$, $W_i$, $W_{i+1}$) and the 3-tuples ($W_i$, $W_{i+1}$, $W_{i+2}$), for each pair of $W_i = W_{i+1}$, marking $W_i$ as W without loss of generality, marking all left contextual words $W_{i-1}$ as {C1, ..., Cn} and marking all right contextual words $W_{i+2}$ as {D1 ... Dn}, and calculating the left contextual adjacent word information entropy LE(WW) and the right contextual adjacent word information entropy RE(WW), respectively:

$$LE(WW) = -\sum_{i=0}^{n} P(C_i \mid WW) * \log P(C_i \mid WW)$$

-continued $$RE(WW) = -\sum_{i=0}^{n} P(D_i \mid WW) * \log P(D_i \mid WW)$$

wherein $$P(C_i \mid WW) = \frac{P(C_i, WW)}{P(WW)} = \frac{freq(C_i, WW)}{freq(WW)},$$

$$P(D_i \mid WW) = \frac{P(D_i, WW)}{P(WW)} = \frac{freq(WW, D_i)}{freq(WW)};$$

wherein $freq(C_i, WW)$ is the frequency that a word string corresponding to the 3-tuple ($C_i$, W, W) appears in the training corpus; $freq(WW, D_i)$ is the frequency that a word string corresponding to the 3-tuple (W, W, $D_i$) appears in the training corpus.

At this time, because $W_i$ is marked as W without loss of generality, $W_i = W_{i+1} = W$, and $W_i W_{i+1}$ in the text can be expressed as WW without loss of generality.

In the method for automatically identifying word repetition errors provided by the present invention, the step of performing statistics to obtain the words containing repeated characters in the Chinese dictionary, recording the words, and establishing a repeated word library of the Chinese dictionary specifically includes:

21) performing statistics to obtain the words containing repeated characters in the Chinese dictionary;
in the present embodiment, that is, performing statistics and looking for words containing continuously identical repeated characters in the Chinese dictionary, such as "man tun tun", "gao gao xing xing", "duo duo yi shan", "xin xin xiang rong", "ha-ha", and/or "Bye Bye", etc.;

22) establishing a repeated word library of the Chinese dictionary and the index structure thereof for recording and storing,
wherein the index structure can improve the efficiency of matching, and in the present embodiment, the index structure is Set<String> wordSet.

In the method for automatically identifying word repetition errors provided by the present invention, the step of judging the repeated words appearing in the text to be subjected to error checking based on the repeated words in the Chinese dictionary in the present embodiment is specifically as follows: performing word segmentation on a sentence corresponding to the text to be subjected to error checking, and judging the repeated words appearing in the text to be subjected to error checking based on the repeated word library of the Chinese dictionary; and as shown in FIG. 1 of the present embodiment, it specifically includes:

31) performing word segmentation on a sentence S' corresponding to the text to be subjected to error checking to obtain S'=$W_1$' ... $W_n$', wherein $W_i$' is a word in the Chinese dictionary, 1<=i<=n;

32) if $W_i = W_{i+1}$' is satisfied, judging whether $W_i$' is a word in the repeated word library of the Chinese dictionary (in the present embodiment, it can also be to say, judging whether $W_i'W_{i+1}$' is a word in wordSet); if yes, judging $W_i'W_{i+1}$' to be a correct repeated word; otherwise, turn to step 33);

33) if $W_i'W_{i+1}$' is not words in the repeated word library of the Chinese dictionary, and if a word on a left thereof is not empty, judging whether $W_{i-1}'W_i'W_{i+1}$' is a word in the repeated word library of the Chinese dictionary; if yes, judging $W_i'W_{i+1}$' to be a correct repeated word; otherwise, if a word on a right thereof is not empty, judging whether $W_i'W_{i+1}'W_{i+2}$' is a word in the repeated word library of the Chinese dictionary; if yes, judging $W_i'W_{i+1}$' to be a correct repeated word; otherwise, turn to the step of judging the repeated words appearing in the text to be subjected to error checking based on the repeated combination degrees, left contextual adjacent word information entropy and right contextual adjacent word information entropy obtained by performing statistics, so as to continuously perform judgments by performing statistics on amount of information.

In the method for automatically identifying word repetition errors provided by the present invention, the step of judging the repeated words appearing in the text to be subjected to error checking based on the repeated combination degrees, left contextual adjacent word information entropy and right contextual adjacent word information entropy obtained by performing statistics, as shown in FIG. 1 of the present embodiment, specifically includes the following steps:

41) for the sentence S'=$W_1$' ... $W_n$' corresponding to the segmented text subjected to error checking, and $W_i' = W_{i+1}$' existing therein, judging whether $W_i'W_{i+1}$' exists in the training corpus; if $W_i'W_{i+1}$' does not exist in the training corpus, judging $W_i'W_{i+1}$' to be an incorrect repeated word, and marking $W_i$' and $W_{i+1}$' as errors; if $W_i'W_{i+1}$' exists in the training corpus, judging whether the repeated combination degree Degree($W_i$', $W_{i+1}$') is equal to 0, and if Degree($W_i$', $W_{i+1}$')=0, judging $W_i'W_{i+1}$' to be an incorrect repeated word, and marking $W_i$' and $W_{i+1}$' as errors; otherwise, turn to step 42);

42) judging whether the repeated combination degree Degree($W_i$', $W_{i+1}$') is greater than α, wherein α is a first preset threshold, and if yes, judging $W_i'W_{i+1}$' to be a correct repeated word; otherwise, turn to step 43);

43) judging the left contextual adjacent word information entropy and the right contextual adjacent word information entropy, if the left contextual adjacent word information entropy LE($W_i'W_{i+1}$')>β or the right contextual adjacent word information entropy RE($W_i'W_{i+1}$')>β, wherein β is a second preset threshold, judging $W_i'W_{i+1}$' to be a correct repeated word; otherwise, turn to step 44);

44) judging frequencies that a 3-tuple $W_{i-1}'W_i'W_{i+1}$' and a 3-tuple $W_i'W_{i+1}'W_{i+2}$' appear in the training corpus, if freq($W_{i-1}$', $W_i$', $W_{i+1}$')>c or freq($W_1$', $W_{i+1}$', $W_{i+2}$')>c, wherein c is a third preset threshold, judging $W_i'W_{i+1}$' to be a correct repeated word; otherwise, judging $W_i'W_{i+1}$' to be an incorrect repeated word, and marking $W_i$' and $W_{i+1}$' as errors; wherein if $W_{i-1}'W_i'W_{i+1}$' does not exist in the training corpus (i.e., training corpus library), freq($W_{i-1}$', $W_i$', $W_{i+1}$')=0, and if $W_i'W_{i+1}'W_{i+2}$' does not exist in the training corpus (i.e., training corpus library), freq($W_i$', $W_{i+1}$', $W_{i+2}$')=0.

The 3-tuple $W_{i-1}'W_i'W_{i+1}$' in the text can also be expressed as a 3-tuple ($W_{i-1}'W_i'W_{i+1}$') or a 3-tuple ($W_{i-1}W_i$', $W_i$', $W_{i+1}$'); the 3-tuple $W_i'W_{i+1}'W_{i+2}$' can also be expressed as a 3-tuple ($W_i'W_{i+1}'W_{i+2}$') or a 3-tuple ($W_i$', $W_{i+1}$', $W_{i+2}$'); freq($W_{i-1}$', $W_i$', $W_{i+1}$') can also be expressed as freq($W_{i-1}'W_i'W_{i+1}$'), and freq($W_i$', $W_{i+1}$', $W_{i-2}$') can also be expressed as freq($W_i'W_{i+1}'W_{i+2}$').

The above α is a first preset threshold, and the first preset threshold α in the present embodiment is 3.0; the above β is a second preset threshold, and the second preset threshold β in the present embodiment is 3.0; and the above c is a third preset threshold, and the third preset threshold c in the present embodiment is 3.0.

In the text, the training corpus can also be called a corpus or a training corpus.

Test: firstly, the present invention is used to perform statistical training on a large-scale training corpus (8G) (the 8G large-scale corpus is the training corpus), and all sentences in the test set include the preset 1000 incorrect repeated words. The method for automatically identifying word repetition errors provided by the present invention is used to perform error checking/identifying of repeated words on the test set, and the test result shows that the recall rate thereof reaches 84%, the precision rate reaches 77%. Hence, the present invention can effectively discover the word repetition errors.

The above embodiments are only the preferred embodiments of the present invention, it should be noted that the above implementation does not constitute a limitation on the present invention, and the various changes and modifications made by the person skilled in the art within the scope of the technical idea of the present invention fall within the protection scope of the present invention.

What is claimed is:

1. A method for automatically identifying word repetition errors in Chinese language based on natural language processing, comprising the following steps:

performing word segmentation on a training corpus, performing statistics training on the training corpus to obtain a two-tuple structure and a three-tuple structure comprising repeated words in the training corpus, and to obtain repeated combination degrees, left contextual adjacent word information entropy, and right contextual adjacent word information entropy in the repeated words;

performing statistics to obtain words containing repeated characters in a Chinese dictionary, recording the words, and establishing a repeated word library of the Chinese dictionary;

judging the repeated words appearing in a text subjected to error checking based on the repeated words in the Chinese dictionary; and judging the repeated words appearing in the text subjected to error checking based on the repeated combination degrees, the left contextual adjacent word information entropy, and the right contextual adjacent word information entropy obtained by the statistics training;

marking incorrect repeated words among the repeated words; and prompting a user about word repetition errors in the text subjected to error checking; wherein the word segmentation and the statistics training on the training corpus further comprises:

11) scanning all sentences in the training corpus to obtain all 2-tuples and 3-tuples containing the repeated words, and performing statistics on frequencies that each tuple of the 2-tuples and 3-tuples appears in the training corpus, respectively; wherein performing word segmentation on a sentence S in the training corpus to obtain $S=W_1 \ldots W_n$, where $W_i$ is a word in the Chinese dictionary, $1<=i<=n$;

for the sentence S, if there is i enabling $W_i=W_{i+1}$ to be satisfied, performing statistics on frequencies $freq(W_i, W_{i+1})$ that a word string gram1 corresponding to a 2-tuple $(W_i, W_{i+1})$ appears in the training corpus, frequencies $freq(W_{i-1}, W_i, W_{i+1})$ that a word string gram2 corresponding to a 3-tuple $(W_{i-1}, W_i, W_{i+1})$ appears in the training corpus, and frequencies $freq(W_i, W_{i+1}, W_{i+2})$ that a word string gram3 corresponding to a 3-tuple $(W_i, W_{i+1}, W_{i+2})$ appears, respectively;

12) calculating the repeated combination degree of the 2-tuple $(W_i, W_{i-1})$ as follows:

$$Degree(W_i, W_{i+1}) = \frac{\log P(W_i, W_{i+1})}{\log P(W_i) * \log P(W_{i+1})},$$

$$\text{wherein, } P(W_i, W_{i+1}) = \frac{freq(W_i, W_{i+1})}{N1},$$

$$P(W_i) = \frac{freq(W_i)}{N},$$

$$P(W_{i+1}) = \frac{freq(W_{i+1})}{N},$$

wherein, $freq(W_i)$ is the frequency that a word $W_i$ appears in the training corpus; $freq(W_{i+1})$ is the frequency that a word $W_{i+1}$ appears in the training corpus; N1 is a sum of frequencies that all the 2-tuples $(W_i, W_{i+1})$ containing the repeated words in the training corpus appear in the training corpus; N is a total frequency that all words in the training corpus appear in the training corpus;

13) for the 3-tuple $(W_{i-1}, W_i, W_{i+1})$ and the 3-tuple $(W_i, W_{i+1}, W_{i+2})$, for each pair of $W_i=W_{i+1}$, marking $W_i$ as W without loss of generality, marking all left contextual words $W_{i-1}$ as $\{C1, \ldots, Cn\}$, and marking all right contextual words $W_{i+2}$ as $\{D1 \ldots Dn\}$, and calculating the left contextual adjacent word information entropy $LE(WW)$ and the right contextual adjacent word information entropy $RE(WW)$, respectively, as follows:

$$LE(WW) = -\sum_{i=0}^{n} P(C_i \mid WW) * \log P(C_i \mid WW),$$

$$RE(WW) = -\sum_{i=0}^{n} P(D_i \mid WW) * \log P(D_i \mid WW),$$

wherein $$P(C_i \mid WW) = \frac{P(C_i, WW)}{P(WW)} = \frac{freq(C_i, WW)}{freq(WW)},$$

$$P(D_i \mid WW) = \frac{P(D_i, WW)}{P(WW)} = \frac{freq(WW, D_i)}{freq(WW)},$$

wherein, $freq(C_i, WW)$ is the frequency that a word string corresponding to a 3-tuple $(C_i, W, W)$ appears in the training corpus; $freq(WW, D_i)$ is the frequency that a word string corresponding to a 3-tuple $(W, W, D_i)$ appears in the training corpus.

2. The method for automatically identifying the word repetition errors of claim 1, wherein step of performing statistics to obtain the words containing the repeated characters in the Chinese dictionary, recording the words and establishing the repeated word library of the Chinese dictionary further comprises:

21) performing statistics on the words containing the repeated characters in the Chinese dictionary; and 22) establishing the repeated word library of the Chinese dictionary and an index structure of the repeated word library for recording and storing.

3. The method for automatically identifying the word repetition errors of claim 2, wherein step of judging the repeated words appearing in the text subjected to error checking based on the repeated words in the Chinese dictionary comprises performing word segmentation on the sentence corresponding to the text subjected to error checking, and judging the repeated words appearing in the text subjected to error checking based on the repeated word library of the Chinese dictionary; and further comprises:

31) performing word segmentation on a sentence S' corresponding to the text subjected to error checking to obtain $S'=W_1' \ldots W_n'$;

32) if $W_i'=W_{i+1}'$ is satisfied, judging whether $W_i'W_{i+1}'$ is a word in the repeated word library of the Chinese dictionary; if yes, judging $W_i'W_{i+1}'$ to be a correct repeated word; otherwise, turn to step 33);

33) if $W_i'W_{i+1}'$ is not a word in the repeated word library of the Chinese dictionary, and if a word on a left of $W_i'W_{i+1}'$ is not empty, judging whether $W_{i-1}'W_i'W_{i+1}'$ is a word in the repeated word library of the Chinese dictionary; if yes, judging $W_i'W_{i+1}'$ to be a correct repeated word; otherwise, if a word on a right of $W_i'W_{i+1}'$ is not empty, judging whether $W_i'W_{i+1}'W_{i+2}'$ is a word in the repeated word library of the Chinese dictionary; if yes, judging $W_i'W_{i+1}'$ to be a correct repeated word; otherwise, turn to the step of judging the repeated words appearing in the text subjected to error checking based on the repeated combination degrees, the left contextual adjacent word information entropy and the right contextual adjacent word information entropy obtained by performing statistics.

4. The method for automatically identifying the word repetition errors of claim 3, wherein step of judging the repeated words appearing in the text subjected to error checking based on the repeated combination degrees, left contextual adjacent word information entropy and right contextual adjacent word information entropy obtained by the statistics training, marking the incorrect repeated words among the repeated words, and prompting the user about the word repetition errors in the text subjected to error checking further comprises the following steps:

41) for the sentence $S'=W_1' \ldots W_n'$ corresponding to a segmented text subjected to error checking, and $W_i'=W_{i+1}'$ existing in the sentence $S'=W_1' \ldots W_n'$, judging whether $W_i'W_{i+1}'$ exists in the training corpus; if $W_i'W_{i+1}'$ does not exist in the training corpus, judging $W_i'W_{i+1}'$ to be an incorrect repeated word, marking $W_i'$ and $W_i+1'$ as errors, and prompting the user about $W_i'W_{i+1}'$ being an incorrect repeated word; if $W_i'W_{i+1}'$ exists in the training corpus, judging whether the repeated combination degree Degree($W_i'$, $W_{i+1}'$) is equal to 0, and if yes, judging $W_i'W_{i+1}'$ to be an incorrect repeated word, marking $W_i'$ and $W_{i+1}'$ as errors, and prompting the user about $W_i'W_{i+1}'$ being an incorrect repeated word; otherwise, turn to step 42);

42) judging whether the repeated combination degree Degree($W_i'$, $W_{i+1}'$) is greater than $\alpha$, wherein $\alpha$ is a first preset threshold, and if yes, judging $W_i'W_{i+1}'$ to be a correct repeated word; otherwise, turn to step 43);

43) judging the left contextual adjacent word information entropy and the right contextual adjacent word information entropy, if the left contextual adjacent word information entropy LE($W_i'W_{i+1}'$)>$\beta$ or the right contextual adjacent word information entropy RE($W_i'W_{i+1}'$)>$\beta$, wherein $\beta$ is a second preset threshold, judging $W_i'W_{i+1}'$ to be a correct repeated word; otherwise, turn to step 44);

44) judging frequencies that the 3-tuple $W_{i-1}'W_i'W_{i+1}'$ and the 3-tuple $W_i'W_{i+1}'W_{i+2}'$ appear in the training corpus, if freq($W_{i-1}'$, $W_i'$, $W_{i+1}'$)>c or freq($W_i'$, $W_{i+1}'$, $W_{i+2}'$)>c, wherein c is a third preset threshold, judging $W_i'W_{i+1}'$ to be a correct repeated word; otherwise, judging $W_i'W_{i+1}'$ to be an incorrect repeated word, marking $W_i'$ and $W_{i+1}'$ as errors, and prompting the user about $W_i'W_{i+1}'$ being an incorrect repeated word.

5. The method for automatically identifying the word repetition errors of claim 4, wherein the first preset threshold $\alpha$ is 3.0; the second preset threshold $\beta$ is 3.0; and the third preset threshold c is 3.0.

6. The method for automatically identifying the word repetition errors of claim 4, wherein in step 44), if $W_{i-1}'W_i'W_{i+1}'$ does not exist in the training corpus, freq($W_{i-1}'$, $W_i'$, $W_{i+1}'$)=0, and if $W_i'W_{i+1}'W_{i+2}'$ does not exist in the training corpus, freq($W_i'$, $W_{i+1}'$, $W_{i+2}'$)=0.

7. The method for automatically identifying the word repetition errors of claim 1, wherein in step 11), if i=1, $W_{i-1}$ is a first character string representing a beginning of the sentence; if i+1=n, $W_{i+2}$ is a second character string representing an ending of the sentence.

* * * * *